United States Patent
Luo et al.

(10) Patent No.: US 7,333,654 B2
(45) Date of Patent: Feb. 19, 2008

(54) DIGITAL IMAGE PROCESSING SYSTEM AND METHOD FOR EMPHASIZING A MAIN SUBJECT OF AN IMAGE

(75) Inventors: Jiebo Luo, Rochester, NY (US); Robert T. Gray, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 239 days.

(21) Appl. No.: 11/316,096

(22) Filed: Dec. 22, 2005

(65) Prior Publication Data

US 2006/0098889 A1    May 11, 2006

Related U.S. Application Data

(63) Continuation of application No. 09/642,533, filed on Aug. 18, 2000, now Pat. No. 7,212,668.

(51) Int. Cl.
    *G06K 9/00* (2006.01)
(52) U.S. Cl. .................................................. 382/165
(58) Field of Classification Search ........ 382/162–167, 382/173–180, 224–228, 203, 282, 283, 190, 382/199, 254, 275; 358/515–527, 453–465; 345/589–604; 348/699–703
See application file for complete search history.

(56) References Cited

U.S. PATENT DOCUMENTS 6,282,317 B1 *  8/2001  Luo et al. .................... 382/203
6,504,951 B1 *  1/2003  Luo et al. .................... 382/165
7,212,668 B1 *  5/2007  Luo et al. .................... 382/165

FOREIGN PATENT DOCUMENTS

EP        0 617 548 A        9/1994
EP        1 017 019 A        7/2000

OTHER PUBLICATIONS

Amit Singhal et al.: "A Multilevel Bayesian Network Approach to Image Sensor Fusion", Information Fusion, 2000, Fusion 2000, Proceedings of the Third International Conference on Jul. 10-13, 2000, Piscataway, NJ, USA, IEEE, Jul. 10, 2000, pp. 9-16, XP010505068, ISBN: 2-7257-0000-0.

(Continued)

*Primary Examiner*—Ishrat Sherali
(74) *Attorney, Agent, or Firm*—Robert L. Walker; David M. Woods

(57) ABSTRACT

A system and method for automatically altering an image having pixels is disclosed. An image is segmented into regions and various features of the regions are extracted and used to calculate a confidence factor, or belief value, that a particular region is a main subject of the image. The belief values are assembled into a belief map that is used to define how pixel values are to be altered. Various color and appearance values of the pixel are altered in a predetermined way to emphasize the main subject of the image. The emphasis is applied in a binary fashion or as in a gradient of values. Either the main subject can be emphasized, or the secondary or background subjects can be de-emphasized. The system can be implement on a variety of computer systems.

29 Claims, 5 Drawing Sheets

OTHER PUBLICATIONS

Ishantha Lokuge et al., Association for Computing Machinery: "GeoSpace: An Interactive Visualization System for Exploring Complex Information Spaces" Human Factors In Computing Systems. CHI 95 Conference Proceedings, Denver, May 7-11, 1995, Conference of Human Factors In Computing Systems, New York, ACM, US, May 7, 1995, pp. 409-414, XP000538471, ISBN: 0-201-84705-1.

"Color Image Quantization Based on Physics and Psychophysics" by Hsien-Che Lee. Journal of Society of Photographic Science and Technology of Japan, vol. 59, No. 1, pp. 212-225, 1996.

"Probabilistic Reasoning in Intelligent Systems: Networks of Plausible Inference" by Judea Pearl. Morgan Kaufmann, San Francisco, CA, 1988.

* cited by examiner

DIGITAL IMAGE PROCESSING SYSTEM AND METHOD FOR EMPHASIZING A MAIN SUBJECT OF AN IMAGE

FIELD OF THE INVENTION

This is a continuation of application Ser. No. 09/642,533 filed on Aug. 18, 2000 now U.S. Pat. No. 7,212,668.

BACKGROUND OF THE INVENTION

It is known in the motion picture industry to manually identify the main subject of an individual image or frame of a motion picture, and then to manipulate the color values to obtain a desired emphasizing effect. The process is accomplished manually and usually requires the digitization of the image or frame into pixels and then manually outlining the subject of interest using a graphic user interface on a computer terminal. The image pixels are then modified by changing the identified subject with respect to the background in some predetermined manner. In recent motion pictures, the effects of blurring the background or changing the background to black and white have been used. An example of the results of this technique can be seen in the motion picture "Pleasantville". This manual process is very labor intensive and hence costly to implement. Yet, the effect is so desirable that motion picture producers are willing to invest the expense to produce images having these effects.

There are several other similar effects that could be envisioned for use to good artistic affect. However, whatever affect is desired, the labor intensive manual effort that is needed greatly limits the use of such techniques. Of course, these effects are also desirable for use in still photograph by amateur or professional photographers. Such use is similarly limited by the cost and inconvenience of the manual technique. In the case of still images, there is not only the manual labor required to manipulate the image, but the effort needed to learn to use software that is capable of doing such manipulation. If such image manipulation is not done regularly, the user has a certain amount of re-learning to do each they desire to manipulate an image.

Consequently, a need exists in the art for an automated method of processing an image having pixels to emphasize a main subject in the image.

SUMMARY OF THE INVENTION

The need in the art is addressed by the system and methods of the present invention. The present invention includes a system and method of modifying an image made up of pixels, by automatically identifying a main subject of the image and altering pixel values to emphasize the main subject. This is accomplished by, among other techniques, altering pixel values in the main subject or altering pixel values in the background, or both.

The process of identifying the main subject may include the step of segmenting the image into a plurality of regions based on uniform image characteristics. Then, calculating a level of saliency for each of the plurality of regions, and assigning a believe value to the pixels corresponding to the levels of saliency of the image they are a part of. The image characteristic used for segmenting may be color or texture, among others.

The level of saliency is calculated as proportional to a region feature, or a combination of region features. The region features may be structural, semantic or other region features as may be contemplated from time to time. The belief values are then ordered according to a probability that a region is a main subject of the image.

In another embodiment of the present invention, a system and method modify an image having pixels through the following routine. First, automatically generating a main subject belief map containing values indicating the location of a plurality of regions in the image, where the main subject belief map containing at least a first belief value associated with one of the regions, and, the belief values are related to the probability that the associated region is a main subject of the image. Next, altering pixel values in the plurality of regions in relation to the associated belief value.

In a further embodiment, the system and method determine a threshold belief value discriminating main subject regions and background regions, and then desaturates the pixels in the background regions. The desaturation step may be accomplished by calculating the luminance values for the pixels in the background regions, and replacing the color values of the pixels in the background regions with their respective luminance values.

In a further embodiment, the system and method computes a saturation value for each pixel, and alters the pixel saturation values according to the associated belief values.

In a further embodiment, the system and method determines a threshold belief value discriminating main subject regions and background regions, and enhances saturation of the pixels in the main subject regions.

In a further embodiment, the system and method determines a threshold belief value discriminating main subject regions and background regions, and computes a saturation value for each pixel in the background regions, then altering the pixel saturation values in the background regions according to the associated belief values.

In a further embodiment, the system and method determines a threshold belief value discriminating main subject regions and background regions, and computes a saturation value for each pixel in the main subject regions, and altering the pixel saturation values in the main subject regions according to the associated belief values.

In a further embodiment, the system and method computes a luminance value for each pixel, and altering the pixel luminance values according to the associated belief values.

In a further embodiment, the system and method determines a threshold belief value discriminating main subject regions and background regions, and, alters the pixel luminance values in the main subject regions according to the associated belief values.

In a further embodiment, the system and method determines a threshold belief value discriminating main subject regions and background regions, and alters the pixel luminance values in the main subject regions according to the associated belief values.

In a further embodiment, the system and method computes a hue value for each pixel, and alters the pixel hue values according to the associated belief values.

In a further embodiment, the system and method determines a threshold belief value discriminating main subject regions and background regions, and alters the pixel hue values in the main subject regions according to the associated belief values.

In a further embodiment, the system and method determines a threshold belief value discriminating main subject regions and background regions, and alters the pixel hue values in the main subject regions according to the associated belief values.

In a further embodiment, the system and method determines a threshold belief value discriminating main subject regions and background regions, and inverts the pixel hue values in the main subject regions.

In a further embodiment, the system and method determines a threshold belief value discriminating main subject regions and background regions, and inverts the pixel hue values in the background regions.

In a further embodiment, the system and method computes a blur value for each pixel, and alters the pixel blur values according to the associated belief values.

In a further embodiment, the system and method determines a threshold belief value discriminating main subject regions and background regions, and calculates a pixel blur value for each pixel, and alters the pixel blur values in the background regions according to the associated belief values.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The subject matter of the invention is described with reference to the embodiments shown in the drawings.

DESCRIPTION OF THE INVENTION

Figure 1:
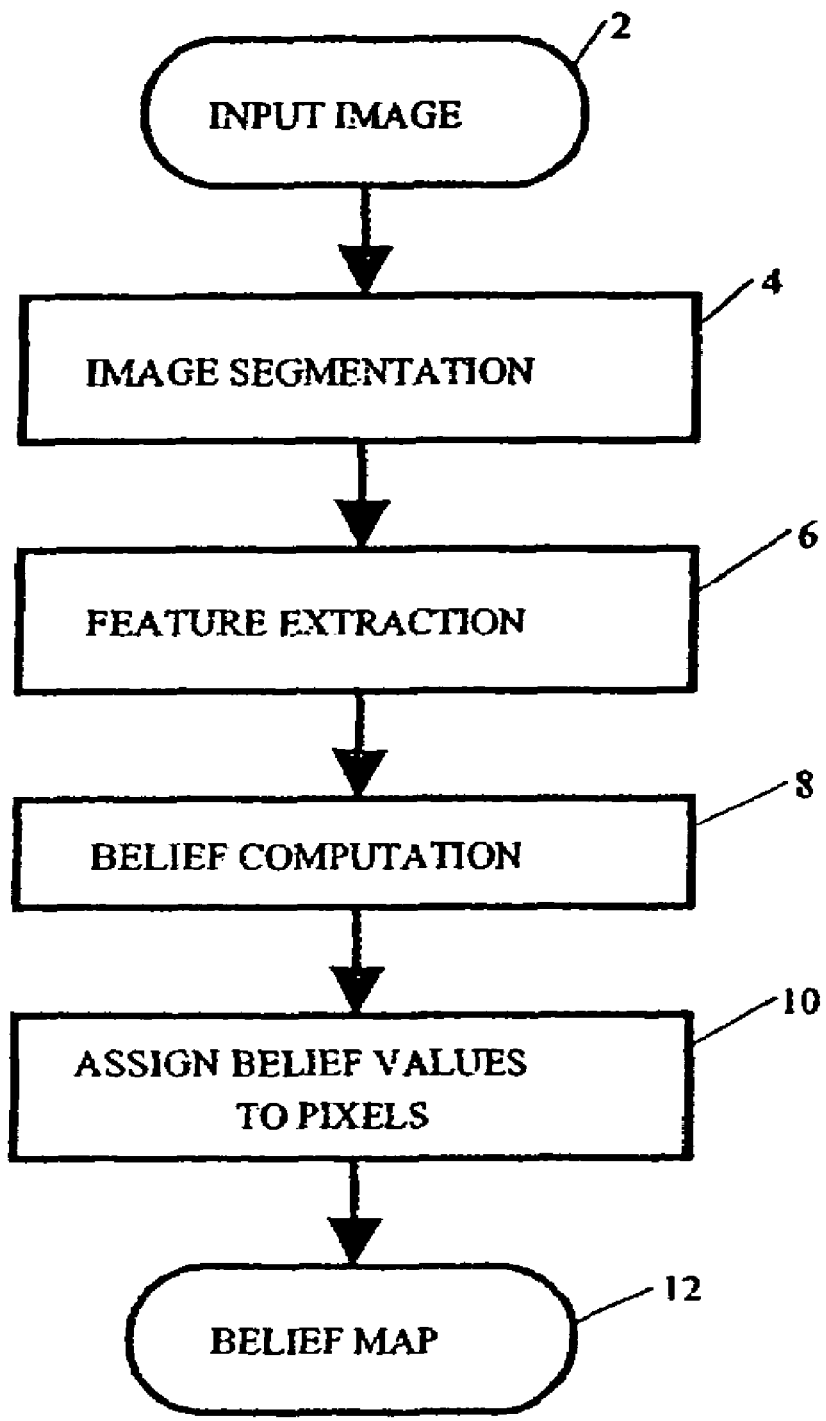
FIG. 1 is flow chart showing the step of generating the main subject belief map in the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention includes a method of automatically detecting the main subject of an image and then automatically altering the value of pixels in the image to produce an altered image that emphasizes the image subject. This automation provides the fundamental advantage of eliminating the need for manual intervention.

There are a number of ways in which the main subject of an image can be emphasized, as will be discussed hereinafter. The main subject can be emphasized by reducing the color saturation of the background to black and white while leaving the main subject at its original color saturation levels. The background can remain at its original color saturation levels while the color saturation of the main subject is enhanced to create an emphasis effect. Or, a combination of changing the saturation of the main subject and background can be used.

In the present invention, the main subject is not differentiated from the background in a mere binary fashion. Rather, a gradient of belief values (importance map) are calculated that are related to the confidence a particular region in an image is the main subject or a background subject. By utilizing a gradient or 'continuously valued' main subject belief map, emphasis can be applied to the main subject so a gradual transition from the main subject to the background occurs, whereby artifacts resulting from the main subject emphasis are less noticeable and therefore less objectionable to an observer.

Because there is a gradient of belief values, threshold values can be selected to separate main subject from background, or to set a plurality of levels, such as main subject, secondary subject, and background subject. With this in mind, it is understood that the image saturation levels, or any other pixel characteristic, could be set to three or more levels, thereby emphasizing each of these areas in a different way. As an example, the main subject could have enhanced saturation levels, the secondary subject could have normal saturation levels, and the background could have zero saturation levels, rendering that section in black and white.

In another advantageous use of the gradient of belief values, the image need not be divided by threshold values into sections, but each gradient step of belief values may become a section in and of itself. In this way, the pixel values may be adjusted according to these gradients producing an image where the desired emphasis follows this gradient. An example is an image where pixels assigned the highest belief value are altered to enhance the saturation and pixels assigned intermediate belief values are each gradually reduced in saturation level until pixels with the lowest belief values have zero, or black and white, saturation values. As will be discussed more fully hereinafter, this advantage of the present invention is important in mitigating the probability that the definition of the belief values will differ somewhat from the subjected interpretation a particular viewer of the image may have as to what the main subject of the image actually is.

According to the present invention, saturation level adjustment is just one way to alter an image to emphasize the main subject. In digital imagery, the pixel values can be defined in several ways. The primary color values red, green, and blue can be used, or, the hue, saturation, and luminance values can be used. Other systems have and can be conceived to define a pixel value. Transformation calculation are used to transform the between these systems. Such a transformation can be expressed as:

$$(hue^{original}, saturation^{original}, luminance^{original}) = T(r^{original}, g^{original}, b^{original}) \quad [1]$$

where r, g, and b express red, green and blue pixel values respectively.

The present invention contemplates the adjustment of any of these values, or combinations of these values to emphasize the main subject in a binary fashion, or according to the aforementioned gradient approach. As an example the main subject may be emphasized by increasing its level of luminance in the altered image. Similarly, the background sections may be de-emphasized be reducing their levels of luminance.

Respecting adjustments to hue, the main subject can be emphasized by adjusting its hue according to the belief value. The hue may be inverted in the main subject, or the background subject, to create a positive/negative effect which emphasizes the main subject. Also, the hue value may be altered according to a gradient of belief values.

Reference is directed to FIG. 1, which is a flow diagram showing how the main subject belief values are assigned to pixels in an image. In summary, an image described by a plurality of pixels is input at step 2. The image is first segmented into homogenous regions at step 4 by analysis of the color or texture of each region. At step 6, features are extracted, which may include structural or semantic features of the image. The process conducts a belief computation at step 8 based, in part, on the extracted feature information, and then assigns belief values to pixels at step 10. The same belief value is assigned to all pixels within each region. The resultant information is compiled into a belief map for the image at step 12. The belief map therefore contains data in the belief value for all pixels in the image on a region by region basis as well as data on the location of each region.

The matter of main subject detection has been developed and is the subject matter of a co-pending patent application assigned to the assignee of the present invention. The system of main subject detection in a consumer-type photographic image from the perspective of a third-party observer has been developed and is described in U.S. patent application Ser. No. 09/223,860 filed to US Patent and Trademark Office on Dec. 31, 1998. The contents of which are hereby incorporated by reference thereto.

Main subject detection provides a measure of saliency or relative importance for different regions that are associated with different subjects in an image. This is the aforementioned gradients of belief values assigned to pixels in an image.

Conventional wisdom in the field of computer vision, which reflects how a human observer would perform such tasks as main subject detection and cropping, calls for a problem-solving path via object recognition and scene content determination according to the semantic meaning of recognized objects.

With respect to the present invention and the reference incorporated by reference, the main subject detection system is built upon mostly low-level vision features with semantic information integrated whenever available. This main subject detection system has a number of sub-tasks, including region segmentation, perceptual grouping, feature extraction, and probabilistic reasoning. In particular, a large number of features are extracted for each segmented region in the image to represent a wide variety of visual saliency properties, which are then input into a tunable, extensible probability network to generate a belief map containing a continuum of values.

Using main subject detection, regions that belong to the main subject are generally differentiated from the background clutter in the image. Thus, selective emphasis of main subjects or de-emphasis of background becomes possible. Automatic subject emphasis is a nontrivial operation that was considered impossible for unconstrained images, which do not necessarily contain uniform background, without a certain amount of scene understanding. In the absence of content-driven subject emphasis, conventional systems rely on a manually created mask to outline where the main subject is. This manual procedure is laborious and has been used in movie production studios. However, it is not feasible to use a manual procedure for commercial mass photo finishing for consumers.

Again, referring to FIG. 1, an input image is segmented into a few regions of homogeneous properties, such as color and texture. The regions are evaluated for their saliency in terms of two independent but complementary feature types; structural features and semantic features. For example, recognition of human skin or faces is semantic while determination of what stands out generically is categorized as structural. Respecting structural features, a set of low-level vision features and a set of geometric features are extracted. Respecting semantic features, key subject matter frequently seen in photographic pictures are detected. The evidences from both types of features are integrated using a Bayes net-based reasoning engine to yield the final belief map of the main subject. For reference on Bayes nets, see J. Pearl, *Probabilistic Reasoning in Intelligent Systems*, Morgan Kaufmann, San Francisco, Calif., 1988, the contents of which are hereby incorporated by reference thereto.

One structural feature is centrality. In terms of location, the main subject tends to be located near the center instead of the periphery of the image, therefore, a high degree of centrality is indicative that a region is a main subject of an image. However, centrality does not necessarily mean a region is directly in the center of the image. In fact, professional photographers tend to position the main subject along lines and intersections of lines that divide an image into thirds, the so-called gold-partition positions or rule of a thirds.

It should be understood that the centroid of the region alone may not be sufficient to indicate the location of a region with respect to the entire image without any indication of its size and shape of the region. The centrality measure is defined by computing the integral of a probability density function (PDF) over the area of a given region. The PDF is derived from the "ground truth" data, in which the main subject regions are manually outlined and marked by a value of one and the background regions are marked by a value of zero, by summing the ground truth maps over an entire training set. In essence, the PDF represents the distribution of main subjects in terms of location. The centrality measure is devised such that every pixel of a given region, not just the centroid, contributes to the centrality measure of the region to a varying degree depending on its location. The centrality measure is defined as:

$$\text{centrality} = \frac{1}{N_R} \sum_{(x,y) \in R} PDF_{\text{MSD\_Location}}(x, y) \qquad [2]$$

where (x,y) denotes a pixel in the region R, $N_R$ is the number of pixels in region R.

If the orientation is unknown, the PDF is symmetric about the center of the image in both vertical and horizontal directions, which results in an orientation-independent centrality measure. If the orientation is known, the PDF is symmetric about the center of the image in the horizontal direction but not in the vertical direction, which results in an orientation-dependent centrality measure.

Another structural feature is borderness. Many background regions tend to contact one or more of the image borders. Therefore, a region that has significant amount of its contour on the image borders is more likely to belong to the background then to the main subject. Two measures are used to characterize the borderness of a region. They include the number of image borders that a region intersects (hereinafter "borderness$_1$") and the percentage of a region's perimeter along the image borders (hereinafter "borderness$_2$").

When orientation is unknown, borderness$_1$ is used to place a given region into one of six categories. This is determined by the number and configuration of image borders that the region is in contact with. A region is in contact with a border when at least one pixel in the region falls within a fixed distance of the border of the image. Distance is expressed as a fraction of the shorter dimension of the image. The six categories for borderness$_1$ are: none, one border, two borders, two facing borders, three or four borders that the region contacts. The more contact a region has with a border increases the likelihood that the regions is not a main subject.

If the image orientation is known, the borderness feature can be redefined to account for the fact that a region that is in contact with the top border is much more likely to be background than a region that is in contact with the bottom border. This results in twelve categories for borderness$_1$ determined by the number and configuration of image borders that the is region in contact with. Using the definition of "in contact with" from above, the four borders of the image are labeled as "Top", "Bottom", "Left", and "Right" according to their position when the image is oriented with objects in the scene standing upright.

The second borderness features, borderness$_2$, is defined as the fraction of the region perimeter that is on the image border. This fraction, intrinsically, cannot exceed one-half, because to do so would mean the region has a negative area, or a portion of the region exists outside the image area, which would be unknown for any arbitrary image. Since such a fraction cannot exceed one-half, the following definition is used to normalize the feature value to a range from zero to one.

Borderness$_2$=2×(number_of_region_perimeter_pixels_on_image_border)/ (number_of_region_perimiter_pixels)     [3]

One of the semantic feature is human skin. According a study of a photographic image database of over 2000 images, over 70% of the photographic images have people and about the same number of images have sizable faces in them. Thus, skin tones are common in images. Indeed, people are the single most important subject in photographs. Therefore, an algorithm that can effectively detect the presence of skin tones is useful in identifying the main subject of an image.

In the present invention, the skin detection algorithm utilizes color image segmentation and a pre-determined skin distribution in a specific chrominance space, as: P(skin|chrominance). It is known by those skilled in the art that the largest variation between different races is along the luminance direction, and the impact of illumination sources is also primarily in the luminance direction. Thus, if a given region falls within the defined chrominance space, the probabilities are that it is skin, regardless of the level of luminance. For reference see Lee, "Color image quantization based on physics and psychophysics," Journal of Society of Photographic Science and Technology of Japan, Vol. 59, No. 1, pp. 212-225, 1996, which is hereby incorporated by reference thereto. The skin region classification is based on maximum probability according to the average color of a segmented region, as to where if falls within the predefined chrominance space. However, the decision as to whether a region is skin or not is primarily a binary one. Utilizing a gradient of skin belief values contradicts, to some extent, the purpose of identifying skin and assigning a higher belief value. To counteract this issue, the skin probabilities are mapped to a belief output via a Sigmoid belief function, which serves as a "soft" thresholding operator. The Sigmoid belief function is understood by those skilled in the art.

Respecting the determination of whether a given region is a main subject or not, the task, is to determine the likelihood of a given region in the image being the main subject based on the posterior probability of:

P(main subject detection|feature)     [4]

In an illustrative embodiment of the present invention, there is one Bayes net active for each region in the image. Therefore, the probabilistic reasoning is performed on a per region basis (instead of per image).

In an illustrative embodiment, the output of main subject detection algorithm is a list of segmented regions ranked in descending order of the likelihood (or belief) that each is a main subject. This list can be readily converted into a belief map in which each region is located and is assigned a belief value proportional to the main subject belief of the region. Therefore, this map can be called a main subject belief map. Because of the gradient of belief values employed in the belief map, the belief map is more than a binary map that only indicates location of the determined main subject. The associated likelihood is also attached to each region so that the regions with large values correspond to regions with higher confidence, or belief, that it is part of the main subject.

To some extent, this belief map reflects the inherent uncertainty for humans to perform such a task as main subject detection because different observers would likely disagree on certain subject matter while agreeing on other subject matter in terms of which are main subjects. This illustrates a problem in binary main subject determinations. The subjective perception of each observer influences the apparent accuracy of the main subject detection algorithm. It is therefore impossible to detect the main subject exactly correctly because what is correct is held only in the opinion of each observer, which opinion varies from observer to observer. However, a binary decision, when desired, can be readily obtained by using an appropriate threshold on the belief map, where regions having belief values above the threshold are arbitrarily defined as main subjects and those below the threshold are arbitrarily defined as background regions.

In several of the embodiments of the present invention, for determination of main subject emphasis, the main subject belief map having a gradient of belief values is utilized instead of a binarized version of the map to avoid making a bad decision that is visually objectionable to certain observers. This aspect of the present invention identifies a substantial advantage thereof in that the emphasis process can be gradual, mitigating the sense that the main subject was inaccurately identified, as compared from observer to observer. Furthermore, using the gradient of belief values of the main subject helps conceal the artifacts introduced by an inaccurate determination of main subject and the background. A binary decision on what to include and what not to include, once made, leaves little room for error. For example, even if portions of the main subject are not assigned the highest belief, with a gradual (as opposed to binary) saturation emphasizing process, it is likely they would retain a close level of saturation and blend, less noticeably, with the rest of the main subject. In other words, if an undesirable binary decision on what to include/exclude is made, there is no recourse to correct the mistake. Consequently, the emphasizing result becomes sensitive to the robustness of the automatic main subject detection algorithm and the threshold used to obtain the binary decision. With a gradient-valued main subject belief map, every region or object is associated with a likelihood of being emphasized or de-emphasized. Moreover, secondary main subjects are indicated by intermediate belief values in the main subject belief map, and can be somewhat emphasized according to a descending order of belief values while the main subject of highest belief values are emphasized the most.

Figure 2:
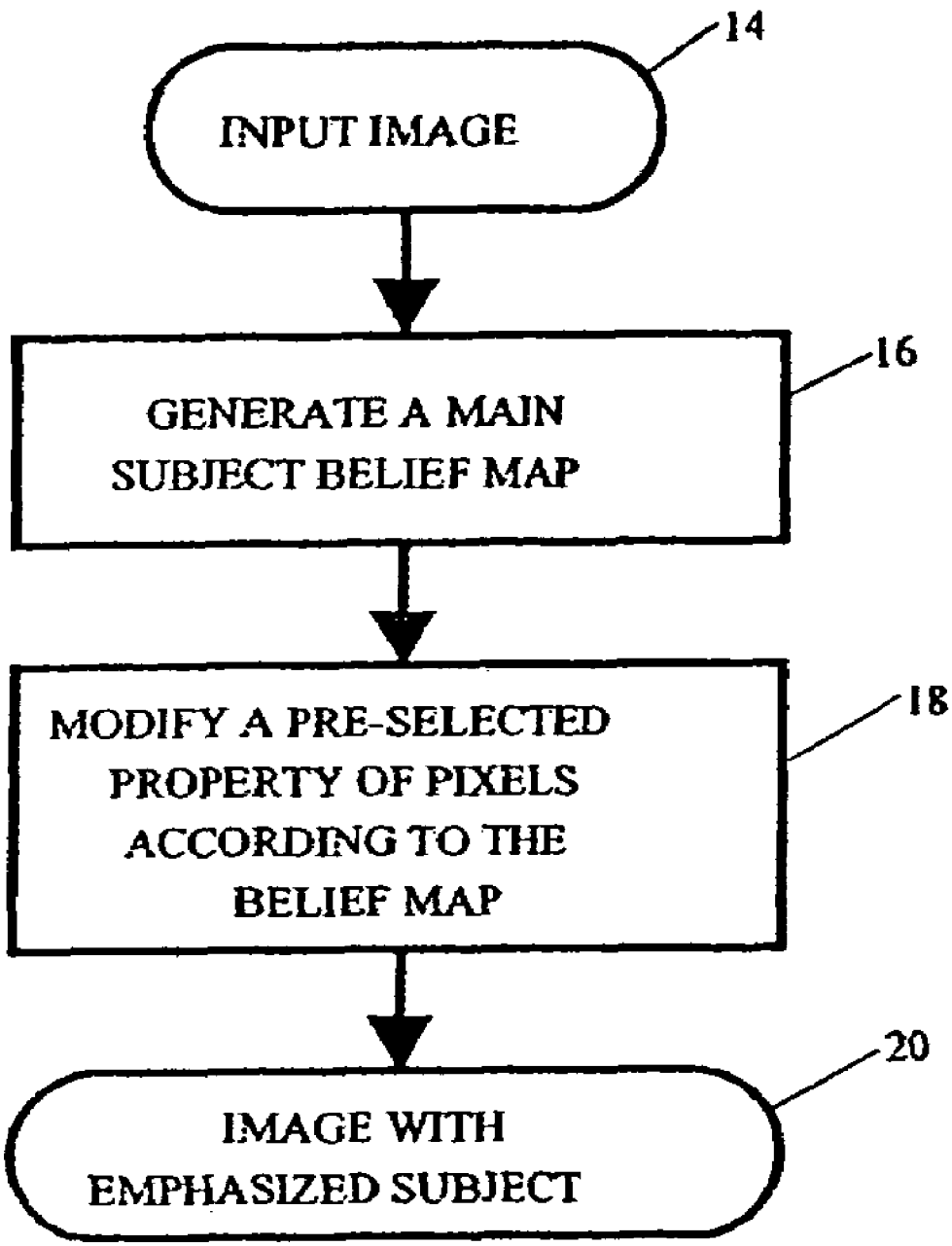
FIG. 2 is a flow chart showing the steps in the method of the present invention according to a first embodiment.

Reference is directed to FIG. 2, which is a flow diagram of the first illustrative embodiment of the present invention. At step 14 an image comprising pixels is input to the process that generates a belief map at step 16 for the image as has been described hereinbefore. The belief map serves as a reference for the modification of selected properties of the pixel color values at step 18. The modified image is output at step 20.

The present invention contemplates that any of the pixel color properties may be altered in accordance with the gradient of belief values generated during the creation of the main subject belief map. In the hue, saturation, and luminance model for color definition, and of the hue, saturation and luminance values could be altered. The pixels in the regions having the highest belief values will be altered to the extreme opposite extent as those pixels in the regions having the lowest belief values. All those regions falling between the two extremes will have pixel modifications that fall in the continuum between the two extremes. The present invention contemplates 256 discrete belief values ranging from zero to 255. However, it is understood that any number or discrete belief values could be used, and that powers of two are preferable due to the nature of computations and data storage in a digital computer.

By way of example, and not limitation, the modification of pixel saturation values in proportion to the belief map values will be described. It is understood that a similar analysis would be appropriate for either the hue or luminance parameters. Color digital images may be created using digital camera, convention film cameras, or directly from computers running image or graphic generating software programs. In the case of conventional film cameras, the film is scanned using a digital scanner to create a digital representation of the film images. In the vast majority of situation, the images are created with the three color, or red, green, blue color model. Therefore, the pixel values in such images can be described by:

$$(r^{original}, b^{original}, g^{original}) \quad [5]$$

By color conversation transformation, as is well understood in the art, the red, blue, green model is transformed to the hue, saturation, luminance model through the transformation:

$$(hue^{original}, saturation^{original}, luminance^{original}) = T(r^{original}, g^{original}, b^{original}) \quad [6]$$

A controlling function determines the proportionality of the subsequent emphasizing transformation. Examples of the controlling functions are:

$$\text{proportional: } f(belief) = a \times belief + f_0 \quad [7]$$

$$\text{inverse proportional } f(belief) = a/belief + f_0 \quad [8]$$

where $f_0$ is a pre-determined offset.

The emphasizing transform then is:
$$saturation^{new} = saturation^{original} \times f(belief) \quad [9]$$

Having completed the emphasizing transformation, the hue, saturation, and luminance values are transformed back to red, blue, green values so that the data is made ready for subsequent processing, such as electronic display, printing, or other communication to a separate entity. The inverse color transform is:

$$(r^{new}, g^{new}, b^{new}) = T^{-1}(hue^{original}, saturation^{new}, luminance^{original}) \quad [10]$$

Figure 3:
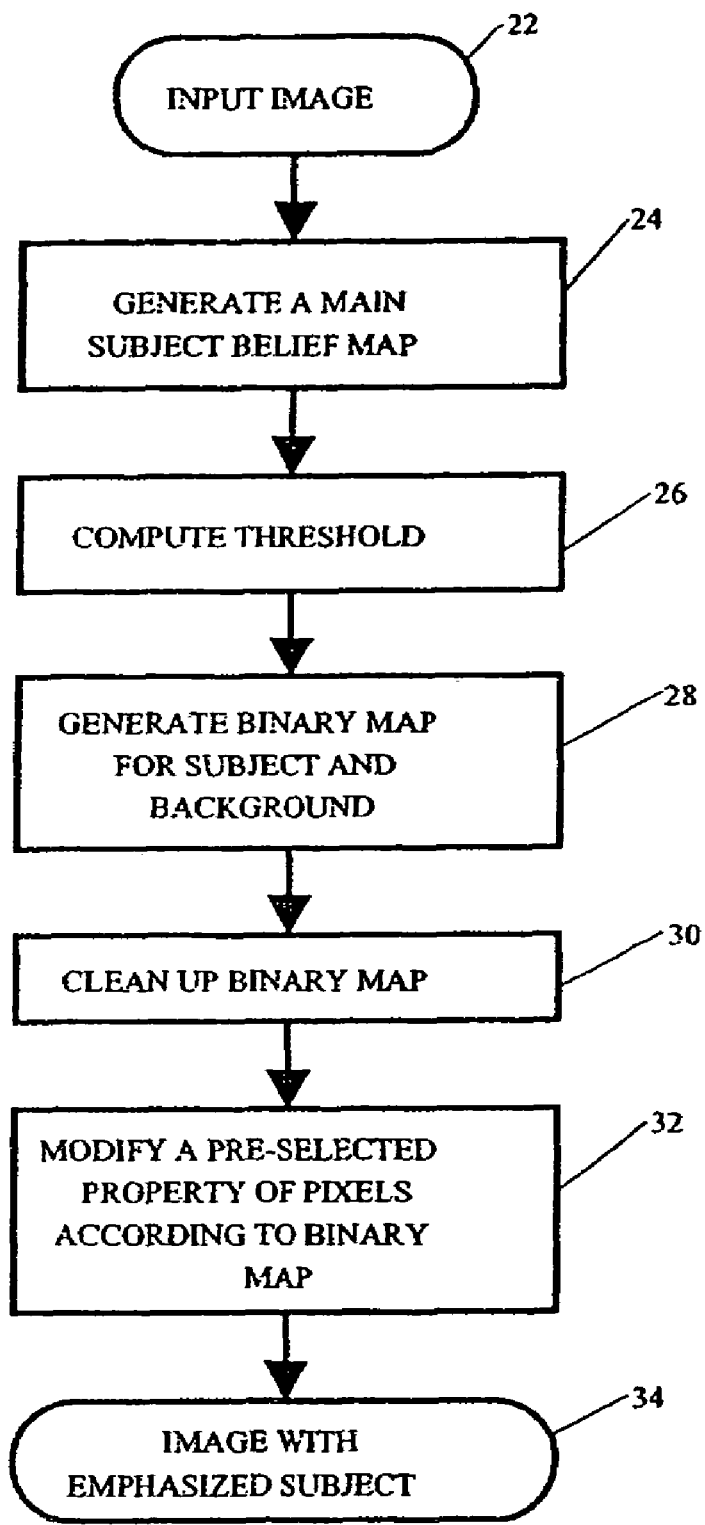
FIG. 3 is a flow chart showing the steps in the method of the present invention according to an alternative embodiment.

Reference is directed to FIG. 3, which is a flow diagram of the second illustrative embodiment of the present invention. At step 22 an image comprising pixels is input to the process, which generates a main subject belief map at step 24 as has been described hereinbefore. A threshold belief value is computed at step 26. The threshold may also be set arbitrarily, or derived from empirical data so as to select a reasonable value that discriminates between the main subject and background subjects at a reasonable level. In the illustrative embodiment, belief values range from zero to one. Selecting a mean point between the two is likely to be over inclusive of background subject matter because the background usually occupies the majority of the image area.

At step 28, a binary map is generated based on the belief map values as compared against the computed threshold. The binary map will identify each region as either main subject or background in a binary fashion. At step 30, the binary map is cleaned of artifacts and other inconsistencies, in the form of isolated small regions, by employing a median filtering operation. The median filtering operation is understood by those skilled in the art.

At step 32, certain pre-selected properties of pixels are modified in accordance with the binary map. At step 34, the image with emphasized main subject is output from the process.

It is clear that at step 32, any number of pre-selected properties could be used in the modification process. By way of example, and not limitation the pre-selected property of background saturation will be used to more fully develop this illustrative embodiment.

The color transform is first accomplished for the entire image by:

$$(hue^{original}, saturation^{original}, luminance^{original}) = T(r^{original}, g^{original}, b^{original}) \quad [11]$$

Next, the luminance value for each pixel in a region identified as a background region is calculated. The color values are replaced with the luminance values for these pixels according to the emphasizing transformation:

$$saturation^{new} = \begin{cases} 0 & belief <= threshold \\ saturation^{original} & otherwise \end{cases} \quad [12]$$

Finally, the inverse color transform is applied:

$$(r^{new}, g^{new}, b^{new}) = T^{-1}(hue^{original}, saturation^{new}, luminance^{original}) \quad [13]$$

Figure 4:
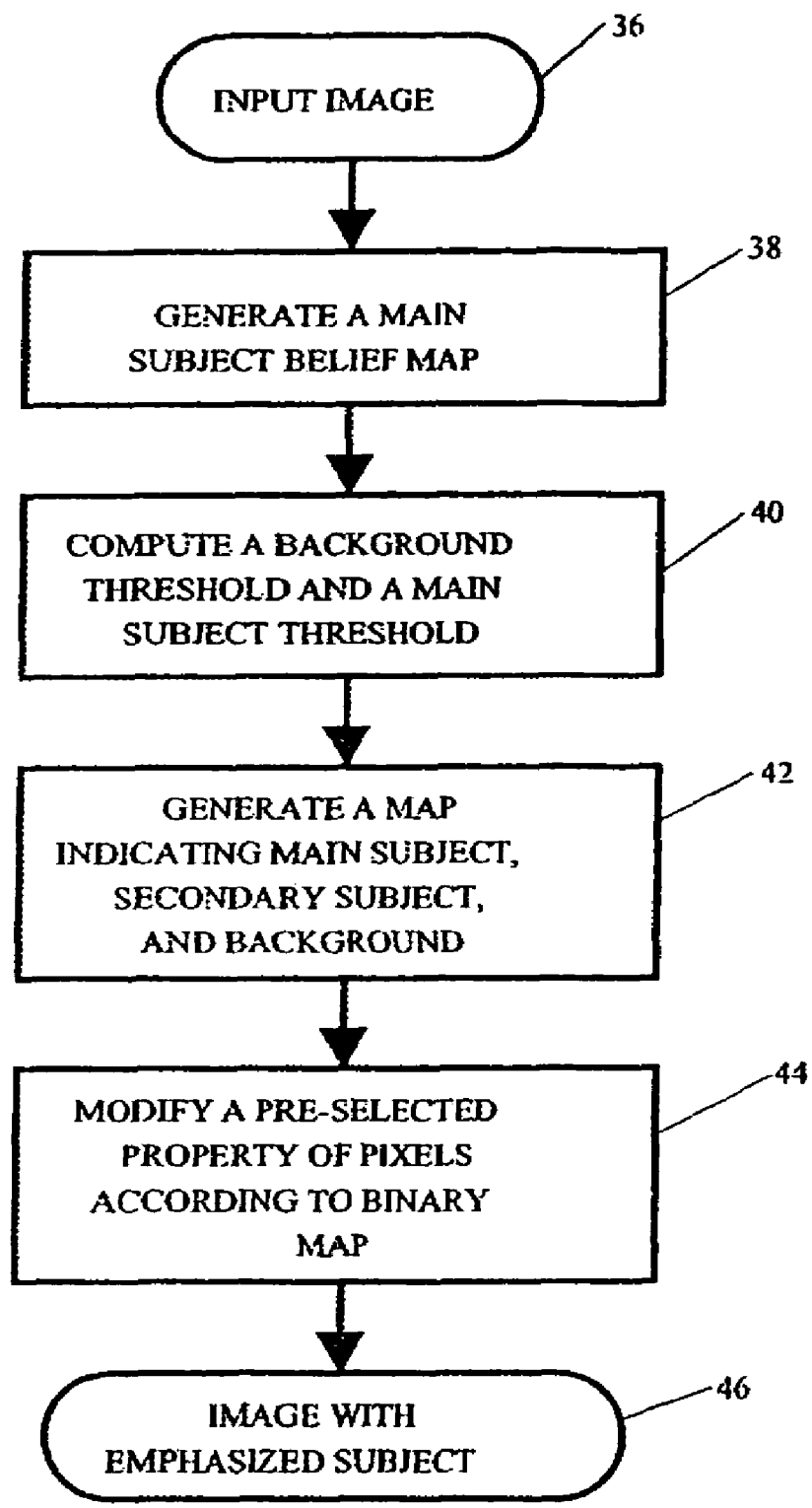
FIG. 4 is a flow chart showing the steps in the method of the present invention according to a further alternative embodiment.

Reference is directed to FIG. 4 which is a flow diagram of the third illustrative embodiment of the present invention. At step 36 an image comprising pixels is input to the process which generates a main subject belief map at step 38 as was described hereinbefore. A background threshold and a main subject threshold are computed at step 40. This step differs from the previous illustrative embodiment in the there are two thresholds. The background threshold sets the maximum belief value for regions that will be deemed to be background. Likewise, the main subject threshold sets the minimum belief value for regions that will be deemed as main subjects. The regions associated with belief values that fall between the background threshold and the main subject threshold are neither background nor main subject and will be treated separately in the emphasizing function. Rather, these regions are called secondary subject regions.

A map is generated at step 42 which assigns one of three values to each region indicated whether such region is a background region, a secondary subject region or a main subject region. At step 44, certain pre-selected properties of the pixels in the images are modified according to the map created in step 42. Finally, at step 46, the emphasized image is output for subsequent processing or utilization.

It is clear that at step 44, any number of pre-selected properties could be used in the modification process. By way of example, and not limitation, the pre-selected property of color saturation will be used to more fully develop this illustrative embodiment.

First, the color transform is calculated as:

$$(\text{hue}^{original}, \text{saturation}^{original}, \text{luminance}^{original}) = T(r^{original}, g^{original}, b^{original}) \quad [14]$$

The belief values are re-mapped according to the computed belief values according to the controlling function:

$$\text{proportional: } f(\text{belief}) = (\text{belief} - \text{belief}_{min})/(\text{belief}_{max} - \text{belief}_{min}) + f_0 \quad [15]$$

$$\text{inverse proportional } f(\text{belief}) = (\text{belief}_{max} - \text{belief})/(\text{belief} - \text{belief}_{min}) + f_0 \quad [16]$$

where $f_0$ is a pre-determined offset.

And remapped per:

$$\text{belief} = \begin{cases} \text{belief}_{min} & \text{belief}^{original} <= \text{threshold}_{background} \\ \text{belief}_{max} & \text{belief}^{original} >= \text{threshold}_{mainsubject} \\ \text{belief}^{original} & \text{otherwise} \end{cases} \quad [17]$$

$$\text{belief}_{min} = \text{threshold}_{background},$$
$$\text{belief}_{max} = \text{threshold}_{mainsubject} \quad [18]$$

With this transform, the minimum belief value is set for all regions with a belief value less than the background threshold value, which sets those regions to black and white. Similarly, the regions having belief values greater than the main subject threshold value are set to the maximum belief value causing these regions, which are the main subject, to be remapped as hyper-saturated regions. The remaining regions that fall between the two thresholds retain their original belief values and are mapped accordingly.

All of the pixels having been remapped as to belief values, the emphasizing transform is processed to assign the new color values:

$$\text{saturation}^{new} = \text{saturation}^{original} \times f(\text{belief}) \quad [19]$$

And finally, the inverse color transform is processed to produce the output, main subject emphasized image:

$$(r^{new}, g^{new}, b^{new}) = T^{-1}(\text{hue}^{original}, \text{saturation}^{new}, \text{luminance}^{original}) \quad [20]$$

In addition to varying the color characteristics of the pixel in an image to emphasize a main subject, other aspects of the image can be varied to achieve a similar emphasis effect. This includes, but is not limited to, region focus, region depth of field, region contrast, and region sharpness. By way of example, and not limitation, what follows is a discussion on blurring the background regions out of focus for the purpose of emphasizing the main subject, which remains in focus and has no blurring effect applied thereto.

The process of blurring a region comprises the steps of determining a background threshold and a main subject threshold value for the belief map, computing the blur values for each pixel in the image, and modifying the blur values of pixels in the digital image according to the belief values in such a way that the sharpness of main subject pixels is retained or increased, while the sharpness of the background is reduced, thereby blurring the background.

A blur value of a pixel can be computed using a blur kernel of size 3×3 pixels, centered at the current pixel. The blur values of all pixels are obtained by convolving the kernel with the original image. Those who are skilled in the art can select any kernel of low-pass filtering characteristic and of any size to achieve desired effect. In the case of a 3×3 blur kernel, a suitable blur value matrix (to be normalized by a factor of $\frac{1}{16}$) is:

$$\begin{bmatrix} 1 & 2 & 1 \\ 2 & 4 & 2 \\ 1 & 2 & 1 \end{bmatrix}$$

The processes disclosed in the present invention are generally accomplished automatically by a computer. This is consistent with the area of technology that deals with digital image processing in general. As such, any of a variety of computer systems and implementations could be used to accomplish the present invention.

The source of digital images may come from digital cameras which may store the images in an internal memory, or may have a removable RAM memory device for transferring digital images, or may utilize a storage medium such as a floppy disk, CD-ROM, or utilize a cable interface to another digital computer. Digital images may come from the scanning of conventional film exposed in a conventional camera and processed in the conventional manner. Digital images may also be entirely man-made though use of a computer. In any event, a digital file containing one or more digital images is ultimately transferred into a memory in a digital computer for processing.

An important feature of the present invention is the high level of automation and the general elimination of user input in the emphasizing process. The only selection to be made is as to what kind of emphasizing is desired. Such as turning the background to black and white, or hyper-saturating the main subject, or inverting the main subject to a negative image, or brightening the main subject and so on. In any case, the identification of the main subject, secondary subjects and background subjects is automated. So is the process of transforming the pixel data and applying the emphasizing functions and transforms. The input and output procedures can be automated as well.

The physical implementation can be on a personal computer running a software application that implements the emphasizing process. A user would transfer one or more digital images into the personal computer and store them in the computer memory or mass storage device. The type of emphasizing function could be present or selected by the user. The emphasizing processes would be accomplished by the central processing unit of the personal computer and the resultant emphasized image would be stored as a separate file in the computer memory or mass storage device. Once stored, the image could be output to the display for viewing, or transferred to another device or printed on a printer.

In a similar vein, the software application could be implemented as a feature in another software application so as to create an added value feature. For example, there are a number of commercially available digital imaging editing programs which allow a broad range of manual photo editing features. Such a software application would benefit from having the automated emphasizing processes incorporated as a new feature to such software.

In another embodiment, the emphasizing process could be implemented on a centralized computer system where the users provide digital image files thereto. For example, digital image files could be transferred via the Internet to the centralized processor where the emphasizing process would take place. Alternatively, users could deliver storage media and an operator at the centralized computer location would transfer the user's digital image files into a memory of the computer. The resultant emphasized file would be returned via the Internet, or delivered to a digital image printer for printing. The resultant printed images being delivered to the user.

For a more localized commercial approach, the computer could be located in a kiosk or mini-lab machine. Consumers would deliver their digital images in one of the aforementioned manners and the kiosk or minilab machine would accomplish the emphasizing process and make photographic prints on an internal printer. The finished prints then are delivered to the consumer. The user may have a choice of not only receiving one or more enhanced versions of the images, but unemphasized prints as well.

If is also useful to emphasize existing photographic prints. For example, a user could select one or more prints out of the family photo album and these prints could be scanned emphasized and printed in emphasized form by one of the aforementioned computer systems.

Figure 5:
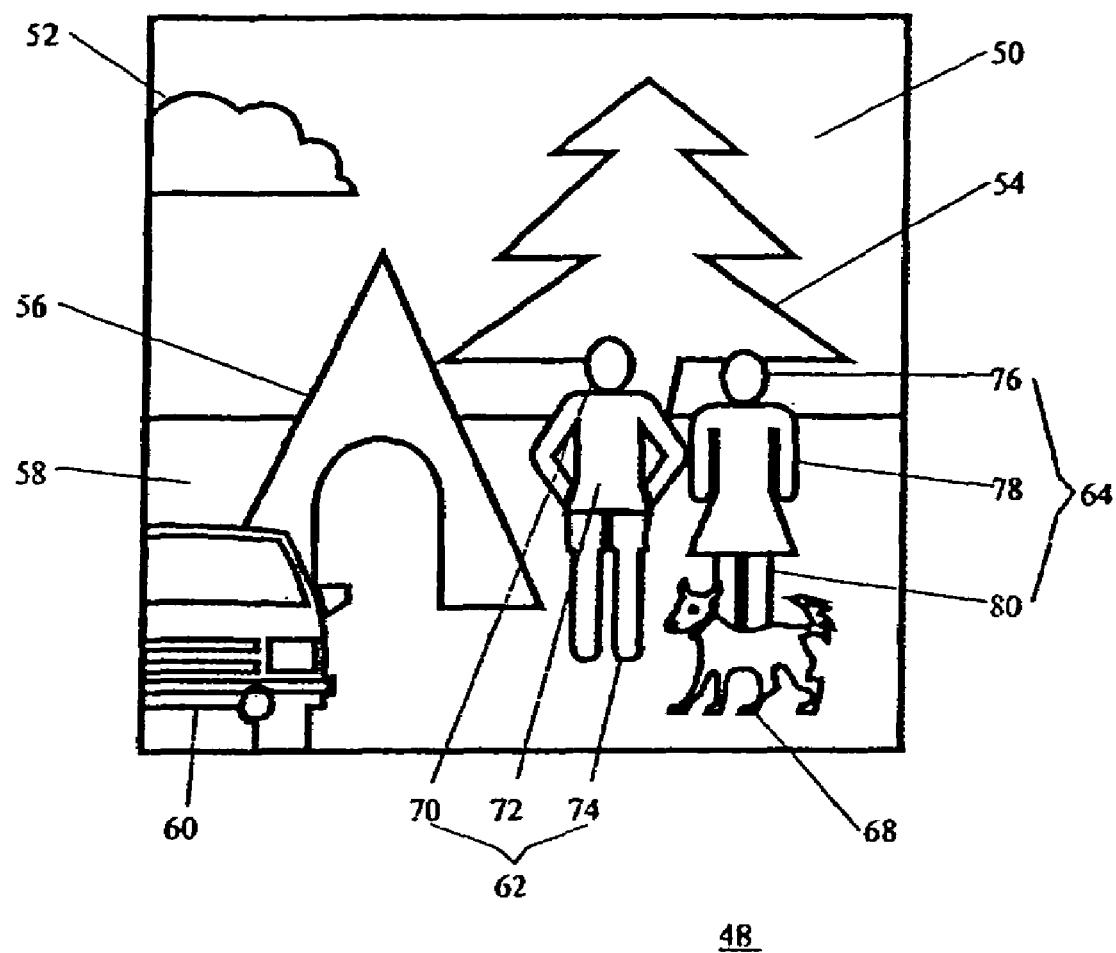
FIG. 5 is a schematic of a photograph used in describing the present invention.

In application, an image may have a greatly varying number of homogenous regions. This could range from a tightly cropped head-shot portrait with a uniform background to a distant landscape/cityscape with a huge number of picture elements. Computers are uniquely qualified to handle such repetitive analytical tasks. Reference is directed to FIG. 5 which is a schematic diagram of a exemplary digital image processing by the present invention. The digital image 48 comprises a number of regions. Generally filling the frame in this example are the sky 50 and ground 58. In the sky 50 are clouds 52. A tree 54 stands on the ground 58. A tent 56 is in view as well as a portion of an automobile 60. A man 62 and woman 64 are standing with a dog 68 in the foreground. The primary issue in processing this image for emphasis is the question as to what the main subject is. From a subjective point of view one might argue that it is a picture of two people. Another might argue that it is a picture of a campsite. Still another that it is a landscape picture. What is correctly the main subject is very much dependent upon this subjective inquiry.

From the perspective of the present invention, the image 48 is already segmented according to regions of homogeneous color or texture. The schematic nature of FIG. 5 depicts this. The faces of the man and women 70 and 76 are identified by the semantic quality skin. The structural relationship of the man's clothing 72 and 74 tie them to the face 70. Similarly, the woman's clothing 78 is tied to her face 76. Her legs 80 may be of skin tone or clothed. These regions would all receive a relatively high belief value under the present invention. Under the borderness constraints, the sky 50 and ground 58 would be assigned relatively low belief values because each contact three boarders of the image. The automobile 60 would receive the second lowest belief value as it is on contact with two boarders. The next higher belief value would be assigned to the clouds 52 as they are in contact with one boarder. This leaves the tree 54, the tent 56, and the dog 68, which would all be assigned intermediate values, called secondary subject values. The dog may receive a slightly higher belief value depending on its color, or whether its close proximity to the regions of the people cause it to be structurally associated therewith.

From this analysis, the belief values would be assigned, in the order from highest to lowest, to the people 62 and 64, the dog 68, the tent and tree 56 and 54, and cloud 52, the automobile 60 and finally the sky and ground 52 and 58. Assuming that an emphasizing algorithm that adjust color saturation is selected and utilizes two threshold values for background and main subject, the emphasized image would appear as follows. The both of the people 62 and 64, and perhaps the dog 68 would appear in a hyper-saturated color. The car 60, the tent 56, the tree 54, and the cloud 52 would retain their original color, and, the ground 58 and sky 50 would appear in a reduced saturation form, perhaps black and white.

Taking this from the perspective of the subjective observers mentioned above, the individual who thought of this as a portrait of two people would be satisfied in that the people in the image would have been plainly emphasized by the process of the present invention. The observer that viewed this as an image of a campsite would be fairly satisfied as the basic element of the campsite; the tent 56, the tree 54, as well as the people, dog, and car would be rendered in color. Perhaps the observer that viewed this image as a landscape would be less satisfied, however, the elements of reduced saturation, the sky and the ground are of somewhat reduced importance, even in a landscape image. This it is understood that the present inventions serves the function of emphasizing a main subject quite effectively, especially in view of the subjective differences that multiple observes have over any given image.

Thus, the present invention has been described herein with reference to a particular embodiment for a particular application. Those having ordinary skill in the art and access to the present teachings will recognize additional modifications, applications and embodiments within the scope thereof. For example, It is therefore intended by the appended claims to cover any and all such applications, modifications and embodiments within the scope of the present invention.

The invention claimed is:

1. A method of modifying an image having pixels, comprising the steps of:
   generating a main subject belief map containing values indicating the location of a plurality of regions in the image;
   determining a threshold belief value discriminating among said regions, a main subject region and background region;
   altering pixel values in said plurality of regions of said image, said altering following said generating, said altering being different in said main subject region and said background region.

2. The method of claim 1 wherein said generating and altering steps are without manual intervention.

3. The method of claim 1 wherein said generating of said map is based upon degree of centrality, borderness, and chrominance space distribution.

4. The method of claim 1 wherein said main subject includes skin tone pixels.

5. The method of claim 1 wherein said computing further comprises:
   calculating a level of saliency of each of said regions; and
   assigning a belief value to each of said pixels corresponding to the level of saliency of the respective said region.

6. The method of claim 5 wherein said calculating further comprises considering a plurality of semantic features including skin regions and a plurality of structural features including centrality.

7. The method of claim 6 wherein said main subject has a high degree of said centrality.

8. The method of claim 6 wherein said main subject includes skin tone pixels.

9. The method of claim 1 wherein said altering further comprises:
   determining a characteristic of each pixel; and
   altering said characteristics according to said associated belief values;
   wherein said characteristics include one or more of: a saturation value, a luminance value, a hue value, a blur value.

10. The method of claim 1 wherein said altering further comprises:
    determining the luminance values for the pixels of said background region; and
    replacing the color values of the pixels of said background region with respective luminance values.

11. The method of claim 1 wherein said altering further comprises enhancing saturation of the pixels of said main subject region.

12. The method of claim 1 wherein said altering further comprises inverting the pixel hue values of the pixels that are a part of said main subject region.

13. The method of claim 1 wherein said altering further comprises inverting the pixel hue values of the pixels that are part of said background region.

14. A method of modifying an image having pixels, comprising the steps of:
    automatically generating a main subject belief map containing values indicating the location of a plurality of regions in the image;
    determining a main subject threshold belief value and a background threshold belief value, said threshold belief values discriminating a main subject region, a secondary subject region, and a background region; and
    automatically altering pixel values in said plurality of regions of said image, said altering following said generating, said altering being different in each of said main subject, secondary subject, and background regions.

15. The method of claim 14 wherein said generating and altering steps are without manual intervention.

16. The method of claim 14 wherein said generating of said map is based upon degree of centrality, borderness, and chrominance space distribution.

17. The method of claim 14 wherein said main subject includes skin tone pixels.

18. The method of claim 14 wherein said computing further comprises:
    calculating a level of saliency of each of said regions; and
    assigning a belief value to each of said pixels corresponding to the level of saliency of the respective said region.

19. The method of claim 18 wherein said calculating further comprises considering a plurality of semantic features including skin regions and a plurality of structural features including centrality.

20. The method of claim 19 wherein said main subject has a high degree of said centrality.

21. The method of claim 14 wherein said main subject includes skin tone pixels.

22. The method of claim 14 wherein said altering further comprises:
    determining a characteristic value for each pixel; and
    altering said characteristic values according to said associated belief values;
    wherein said characteristic values include one or more of: a luminance value, a hue value, a blur value.

23. The method of claim 14 wherein said altering further comprises:
    determining the luminance values for the pixels of said background region; and
    replacing the color values of the pixels of said background region with respective luminance values.

24. The method of claim 14 wherein said altering further comprises enhancing saturation of the pixels of said main subject region.

25. The method of claim 14 wherein said altering further comprises inverting the pixel hue values of the pixels that are a part of said main subject region.

26. The method of claim 14 wherein said altering further comprises inverting the pixel hue values of the pixels that are part of said background region.

27. A method of modifying an input image having pixels, comprising the steps of:
    receiving a user selection of one of a plurality of different emphasis types to provide a selected emphasis;
    automatically generating a main subject belief map containing values indicating the location of a plurality of regions in the input image;
    determining a main subject threshold belief value and a background threshold belief value, said threshold belief values discriminating a main subject region, a secondary subject region, and a background region; and
    automatically altering pixel values in said plurality of regions of said input image to provide an output image, said altering following said generating, said altering being different in each of said main subject, secondary subject, and background regions, said altering being in accordance with said selected emphasis.

28. The method of claim 27 further comprising delivering said output image to an output device.

29. The method of claim 28 wherein said output device is a printer or a display.

* * * * *

UNITED STATES PATENT AND TRADEMARK OFFICE
CERTIFICATE OF CORRECTION

PATENT NO. : 7,333,654 B2
APPLICATION NO. : 11/316096
DATED : February 19, 2008
INVENTOR(S) : Jiebo Luo et al.

Page 1 of 1

It is certified that error appears in the above-identified patent and that said Letters Patent is hereby corrected as shown below:

| On the Title Page | | Description of Error |
|---|---|---|
| Item (57) (Abstract) | line 13 | Delete "implement" and insert -- implemented --, therefor. |
| Col. 16 | line 3 | In Claim 21, delete "claim 14", and insert -- claim 19 --, therefor. |

Signed and Sealed this

Ninth Day of February, 2010

David J. Kappos
*Director of the United States Patent and Trademark Office*